US012210117B2

(12) United States Patent
Prager et al.

(10) Patent No.: US 12,210,117 B2
(45) Date of Patent: Jan. 28, 2025

(54) SOFTWARE DEFINED RADAR

(71) Applicant: UNIVERSITY OF SOUTHERN CALIFORNIA, Los Angeles, CA (US)

(72) Inventors: Samuel Prager, Los Angeles, CA (US); Mahta Moghaddam, Los Angeles, CA (US); John Stang, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 412 days.

(21) Appl. No.: 17/433,224

(22) PCT Filed: Mar. 26, 2020

(86) PCT No.: PCT/US2020/024956
§ 371 (c)(1),
(2) Date: Aug. 23, 2021

(87) PCT Pub. No.: WO2020/198470
PCT Pub. Date: Oct. 1, 2020

(65) Prior Publication Data
US 2022/0120851 A1    Apr. 21, 2022

Related U.S. Application Data
(60) Provisional application No. 62/823,786, filed on Mar. 26, 2019.

(51) Int. Cl.
*G01S 7/288* (2006.01)
*G01S 7/03* (2006.01)
*G01S 13/02* (2006.01)
*G01S 13/90* (2006.01)

(52) U.S. Cl.
CPC .............. *G01S 7/2886* (2021.05); *G01S 7/03* (2013.01); *G01S 13/0209* (2013.01); *G01S 13/90* (2013.01)

(58) Field of Classification Search
CPC ...... G01S 7/2886; G01S 7/03; G01S 13/0209; G01S 13/90
See application file for complete search history.

(56) References Cited

U.S. PATENT DOCUMENTS

| 2012/0146852 | A1 | 6/2012 | Park et al. |
| 2012/0313813 | A1 | 12/2012 | Brooks |
| 2015/0160065 | A1 | 6/2015 | Sai |
| 2017/0293025 | A1* | 10/2017 | Davis .................... G01S 7/023 |

(Continued)

OTHER PUBLICATIONS

D. J. Rabideau, "Nonlinear synthetic wideband waveforms," Proceedings of the 2002 IEEE Radar Conference (IEEE Cat. No. 02CH37322), Long Beach, CA, USA, 2002, pp. 212-219, doi: 10.1109/NRC.2002.999721. (Year: 2002).*

(Continued)

*Primary Examiner* — Vladimir Magloire
*Assistant Examiner* — Noah Yi Min Zhu
(74) *Attorney, Agent, or Firm* — Snell & Wilmer LLP

(57) ABSTRACT

Systems and methods for software defined radar are disclosed. Exemplary systems utilize a frequency stacking bandwidth reconstruction technique for a stepped frequency signal to create a synthetic wideband waveform. The methods enable low-cost, reconfigurable applications such as ground penetrating radar or small unmanned aerial vehicle synthetic aperture radar platforms.

16 Claims, 10 Drawing Sheets

(56) References Cited

U.S. PATENT DOCUMENTS

2018/0294832 A1* 10/2018 Chi .................. H03L 7/099
2020/0124705 A1* 4/2020 Buonocore ......... G01S 13/0209

OTHER PUBLICATIONS

Z. Ding, W. Gao, J. Liu, T. Zeng and T. Long, "A Novel Range Grating Lobe Suppression Method Based on the Stepped-Frequency SAR Image," in IEEE Geoscience and Remote Sensing Letters, vol. 12, No. 3, pp. 606-610, Mar. 2015, doi: 10.1109/LGRS.2014.2352676. (Year: 2015).*

S. Prager, T. Thrivikraman, M. Haynes, J. Stang, D. Hawkins and M. Moghaddam, "Ultra-wideband synthesis for high-range resolution software defined radar," 2018 IEEE Radar Conference (RadarConf18), Oklahoma City, OK, USA, 2018, pp. 1089-1094, doi: 10.1109/RADAR.2018.8378713. (Year: 2018).*

International Search Report and Written Opinion (mailing date Jul. 17, 2020) for Corresponding International PCT Patent Application No. PCT/US2020/024956, filed Mar. 26, 2020.

Samuel Prager et al. Ultra-wideband synthesis for high-range resolution software defined radar 2018 IEEE Radar Conference (RadarConf18), Apr. 27, 2018, pp. 1089-1092 and figure 4.

* cited by examiner

SOFTWARE DEFINED RADAR

CROSS-REFERENCE TO RELATED APPLICATIONS

This application claims priority to and the benefits of U.S. Provisional Patent Application 62/823,786 filed on Mar. 26, 2019 and entitled "Software Defined Radar for USRP Software Defined Radio Platform," the entirety of which, including any appendices, is incorporated herein by reference for all purposes.

TECHNICAL FIELD

The present disclosure relates to radar, and more particularly, to systems and methods utilized in connection with software defined radar techniques.

BACKGROUND

Radar sensors are desirable to achieve scientific, commercial and/or military goals for detection, surveillance and/or characterization of discrete or extended targets. Radar systems provide precise power and phase-sensitive distance measurements to scattering targets and media that are hidden from or otherwise inaccessible to optical and other higher-frequency electromagnetic regime sensors. Current and previous generations of radar systems are generally highly specialized, having complex application-specific hardware designs that are nearly impossible to reconfigure. As such, these radar sensors must be designed, tested and/or refined on a system-by-system basis, making them exceedingly expensive—and for some applications prohibitively so.

Software Defined Radar (SDRadar) has been proposed as a next generation platform for a number of existing radar systems, which may be generally characterized by specialized application-specific hardware designs that are difficult or impossible to reconfigure. The potential multipurpose capability, low cost, rapid implementation time and high reconfigurability have made development of SDRadar technologies an area of significant interest. Accordingly, improved SDRadar systems and techniques remain desirable.

SUMMARY

In various embodiments, a method for software defined radar sensing comprises: receiving, at a processor, a frequency plan including a plurality of frequencies to be detected; receiving, by the processor, a series of reflected pulses each corresponding to a radar signal at one of the plurality of frequencies to be detected, the series of reflected pulses being obtained over a period of time; shifting, by the processor, a corresponding reflected pulse of the series of reflected pulses to a corresponding frequency of the plurality of frequencies to obtain a plurality of frequency-shifted pulses; and accumulating, by the processor, each of the plurality of frequency-shifted pulses to construct a synthetic wideband waveform (SWW).

In other embodiments, a software defined radar sensing system comprises a processor; and an input device coupled to the processor. The software defined radar sensing system is configured to: receive, by the processor and via the input device, a frequency plan including a plurality of frequencies to be detected; receive, by the processor, a series of reflected pulses each corresponding to a radar signal at one of the plurality of frequencies to be detected, the series of reflected pulses being obtained over a period of time; shift, by the processor, a corresponding reflected pulse of the series of reflected pulses to a corresponding frequency of the plurality of frequencies to obtain a plurality of frequency-shifted pulses; and accumulate, by the processor, each of the plurality of frequency-shifted pulses to construct a synthetic wideband waveform (SWW).

The foregoing features and elements may be combined in any combination, without exclusivity, unless expressly indicated herein otherwise. These features and elements as well as the operation of the disclosed embodiments will become more apparent in light of the following description and accompanying drawings. The contents of this section are intended as a simplified introduction to the disclosure and are not intended to be used to limit the scope of any claim.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments makes reference to the accompanying drawings, which show various embodiments by way of illustration. While these various embodiments are described in sufficient detail to enable those skilled in the art to practice the principles of the disclosure, it should be understood that other embodiments may be realized and that changes may be made without departing from the scope of the disclosure.

Thus, the detailed description herein is presented for purposes of illustration only and not of limitation. Furthermore, any reference to singular includes plural embodiments, and any reference to more than one component or step may include a singular embodiment or step. It should also be understood that unless specifically stated otherwise, references to "a," "an" or "the" may include one or more than one and that reference to an item in the singular may also include the item in the plural. Also, any reference to attached, fixed, connected, or the like may include permanent, removable, temporary, partial, full or any other possible attachment option. Additionally, any reference to without contact (or similar phrases) may also include reduced contact or minimal contact. Further, all ranges may include upper and lower values and all ranges and ratio limits disclosed herein may be combined.

Software Defined Radar (SDRadar) has been suggested as a next-generation platform that may address problems in conventional radar systems involving design complexity, cost and reconfigurability. SDRadar systems are intended to be capable of multipurpose operation and real-time reconfiguration. Common hardware designs reduce cost and system implementation time, making exploration of SDRadar technologies an area of significant research interest. Recently, a number of multi-function radar missions have employed SDRadars and software-defined techniques. For example, weather radars from the U.S Department of Energy and the University of Oklahoma Advanced Radar Research Center, among others, have adopted SDRadar-based receivers for their operational flexibility and low cost.

Figure 1A:
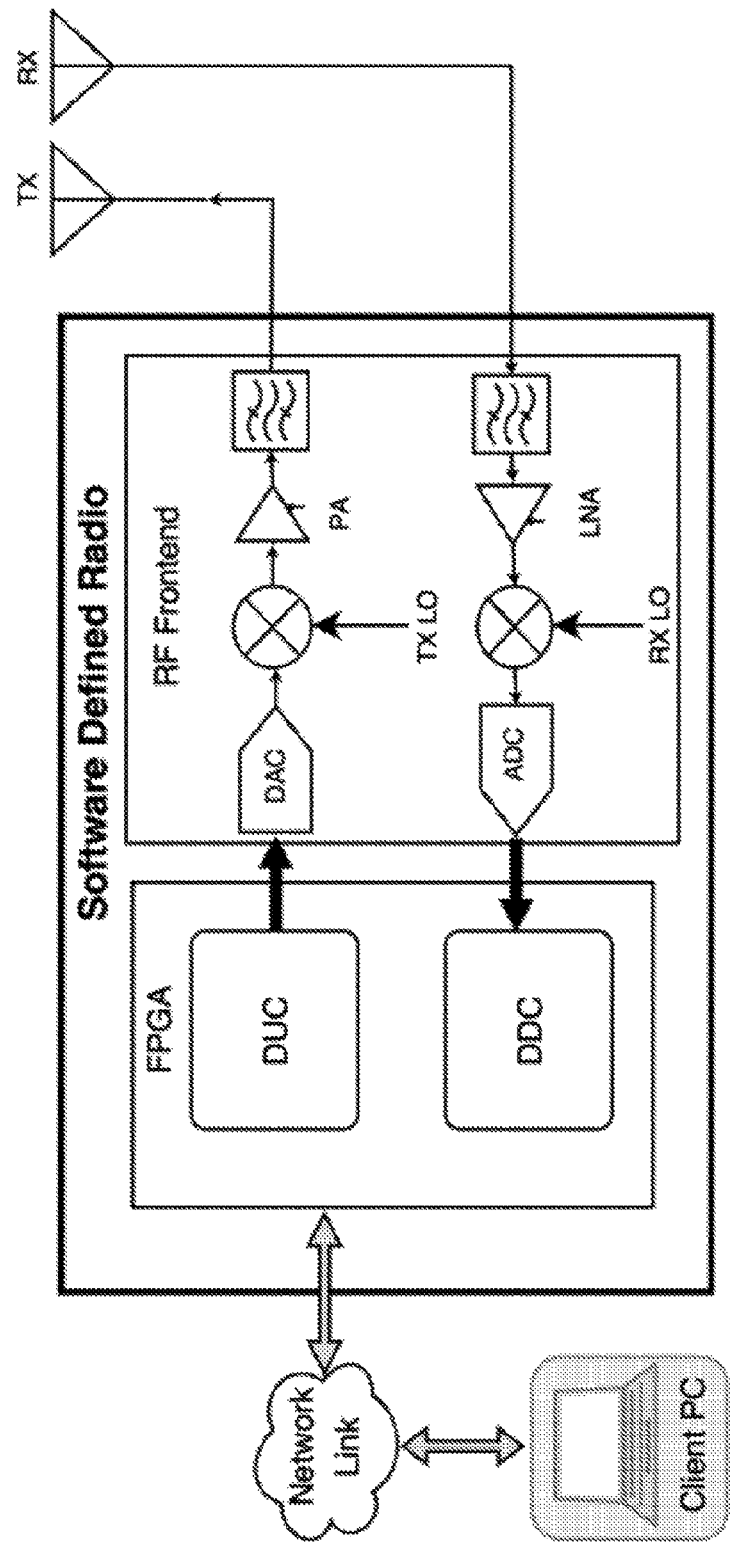
FIG. 1A illustrates a block diagram of an exemplary software defined radio system, in accordance with various embodiments.

Due to similar hardware needs and the flexibility afforded by software, SDRadars are commonly implemented in commercial software defined radio (SDR) systems. The SDR paradigm calls for digital signal processing to be performed completely in software and field programmable gate array (FPGA) firmware, with a hardware frontend that performs analog-to-digital (ADC) and digital-to-analog (DAC) conversion, as well as radio frequency (RF) mixing, amplification and/or filtering. An exemplary SDR architecture, with digital up/down-converters (DUC/DDC) implemented in FPGA fabric, is illustrated in FIG. 1A. Via application of principles of the present disclosure, commercial SDRs can provide inexpensive and accessible platforms in which SDRadars can be implemented.

In various embodiments, a sub-class of SDRadars may be implemented in commercial SDR hardware designed for communications applications. Comparatively, commercial SDR systems intended for communications applications are extremely low-cost, leading to widespread interest in using them for remote-sensing tasks. However, the tradeoff is typically their low performance for such radar applications.

Unlike conventional radars, communications SDR boards are designed without the need for coherence. Thus, a challenge is to make SDR-based SDRadars coherent. While coherency is preferable, in various embodiments, the system enables practical application of such coherency challenged SDRs for applications such as, for example, ground penetrating radar (GPR), non destructive testing, environmental monitoring and imaging, and/or deployment on small slow-moving autonomous vehicles wherein targets are not moving and high resolution is desired. As such, exemplary systems and methods can enable, for example, for swarms of low cost radar sensors that can be dynamically reconfigurable and have extremely high bandwidth with the potential to use any waveform.

The prior approach to SDRadar design follows the SDR paradigm of generating waveform samples in software on a computer and streaming them over a physical interface to an FPGA for up-sampling and digital-to-analog conversion. In these prior approaches, the transmitted signal bandwidth is often limited by the data transfer rate of the interface, requiring a DUC/DDC to reduce bandwidth resulting in relatively poor range resolution performance. In essence, common inexpensive modern processors cannot keep up with FPGA sampling rates. Furthermore, the time delay introduced by data transfer between the FPGA and processor is non-deterministic which poses a problem for time-coherent radar systems that require precise timing to be known. Prior approaches for implementing SDRadar in SDR hardware focused on (i) improving resolution by increasing the FPGA-to-processor data transfer rate with more capable computers and faster interfaces and (ii) measuring and correcting non-deterministic time delays that cause a loss of inter-pulse time coherence. For repeated waveforms and pulsed operation, these approaches consume excess data bandwidth and unnecessarily introduce a bottleneck in the transmitted signal bandwidth. Furthermore, prior SDRadar designs remain constrained by the performance of commercially available SDR hardware.

The Universal Software Radio Peripheral (USRP) series of SDR hardware platforms are used widely for SDRadar and have been used across a diverse range of remote sensing applications from ionospheric sounding radar to ground penetrating radar. However, low instantaneous bandwidth and, therefore, low range resolution are cited as limiting factors for applications that require high resolution. Despite having low instantaneous bandwidth, USRP SDRs are capable of RF frontend band tuning over a wide range. Various embodiments exploit this capability to improve SDRadar resolution.

Frequency-stepped radar is commonly used as a means of obtaining high range resolution with limited instantaneous bandwidth. However, stepping across a wide band in steps small enough to reconstruct the band from pure tones is inefficient (e.g., in USRP SDR hardware) due to local oscillator (LO) tuning times that are long relative to the ADC sampling and data transfer rates. It is most time-efficient to use all of the available instantaneous bandwidth at each step and minimize LO re-tunings. However, using wideband sub-pulse waveforms and increasing the frequency step size gives rise to undesirable grating lobes.

In various embodiments, methods disclosed herein employ a frequency stacking technique based on a wideband stepped-chirp reconstruction to reconstruct a synthetic wideband waveform (SWW). In addition, exemplary methods incorporate practical techniques for mitigating the widely documented grating-lobes that are characteristic of SWW waveforms.

In various embodiments, exemplary systems comprise a tunable SDRadar implementation of SWW reconstruction that is capable of ultra-wideband, high-range resolution performance. In various embodiments, hardware implementation allows the total bandwidth, pulse length, waveform, frequency bands, and SWW sidelobe levels, to be dynamically tuned so that the algorithm can be optimized to application-specific requirements either remotely or in real-time.

In various embodiments, systems leverage emergent SDR technologies, such as the RF Network on Chip (RFNoC) infrastructure. In various embodiments, systems implement waveform generation and pulse control tasks in the FPGA fabric, enabling more efficient bandwidth usage and improvements in timing accuracy and reliability.

For the sake of brevity, conventional techniques for radar, software defined radio, FPGA configuration, filtering, sampling, digital and/or analog signal processing, and/or the like may not be described in detail herein. Furthermore, the connecting lines shown in the various figures provided herein are intended to represent exemplary functional relationships, electrical connections or relationships, or physical or communicative couplings between various elements. It should be noted that many alternative or additional functional relationships or physical or communicative connections may be present in a practical system or related methods of use; for example, in connection with a SDRadar system such as may be operative on an unmanned aerial vehicle.

Further, various shortcomings of prior systems and approaches may be addressed by utilizing systems and methods configured in accordance with the principles of the present disclosure. With exemplary methods and systems, an ultra-wideband high-performance coherent SDRadar may be implemented effectively, for example in any low-cost commercial SDR platform. In various embodiments, algorithms are waveform-independent, allowing for any pulse-compression waveform as well as different waveforms at each new center frequency. Further, in various embodiments, algorithms can construct SWWs from any set of specified center tuning frequencies, allowing tunable spectrum usage. Moreover, as the market for RF communications hardware is changing rapidly, exemplary methods are readily implemented on next-generation SDR hardware that can yield performance improvements. However, the exemplary processing methods do not require custom developed hardware, and instead, may be universal techniques. Additionally, exemplary algorithms do not require coherent RF hardware, so they can also be used in truly incoherent systems, such as bistatic and multistatic non-colocated receivers.

As compared to various prior approaches, exemplary systems and methods can achieve significant improvements in resolution. For example, a prior approach for a "high resolution software defined radar" offered a resolution of about 6 meters. Via implementation of exemplary algorithms (e.g., frequency stacking as discussed in more detail below), exemplary systems are able to obtain resolution of about 3 centimeters—an improvement of more than two orders of magnitude over such prior approaches.

In various embodiments, the innovations may include, for example: (i) using SDR with RF Network on Chip (RFNoC) to implement an arbitrary waveform generator (AWG) within the FPGA fabric to increase instantaneous bandwidth while freeing FPGA-to-processor capacity for receiving (RX) samples only; (ii) combining non-uniform pulse spacing, overlapping bands, and a grating-lobe suppression (GLS) filter for arbitrary spectrum shaping, thus creating tunable performance metrics; and (iii) a SWW reconstruction method capable of ultra-wideband coherent operation in commercial SDR hardware, where such hardware is designed for communications applications and is fundamentally non-coherent.

Figure 1B:
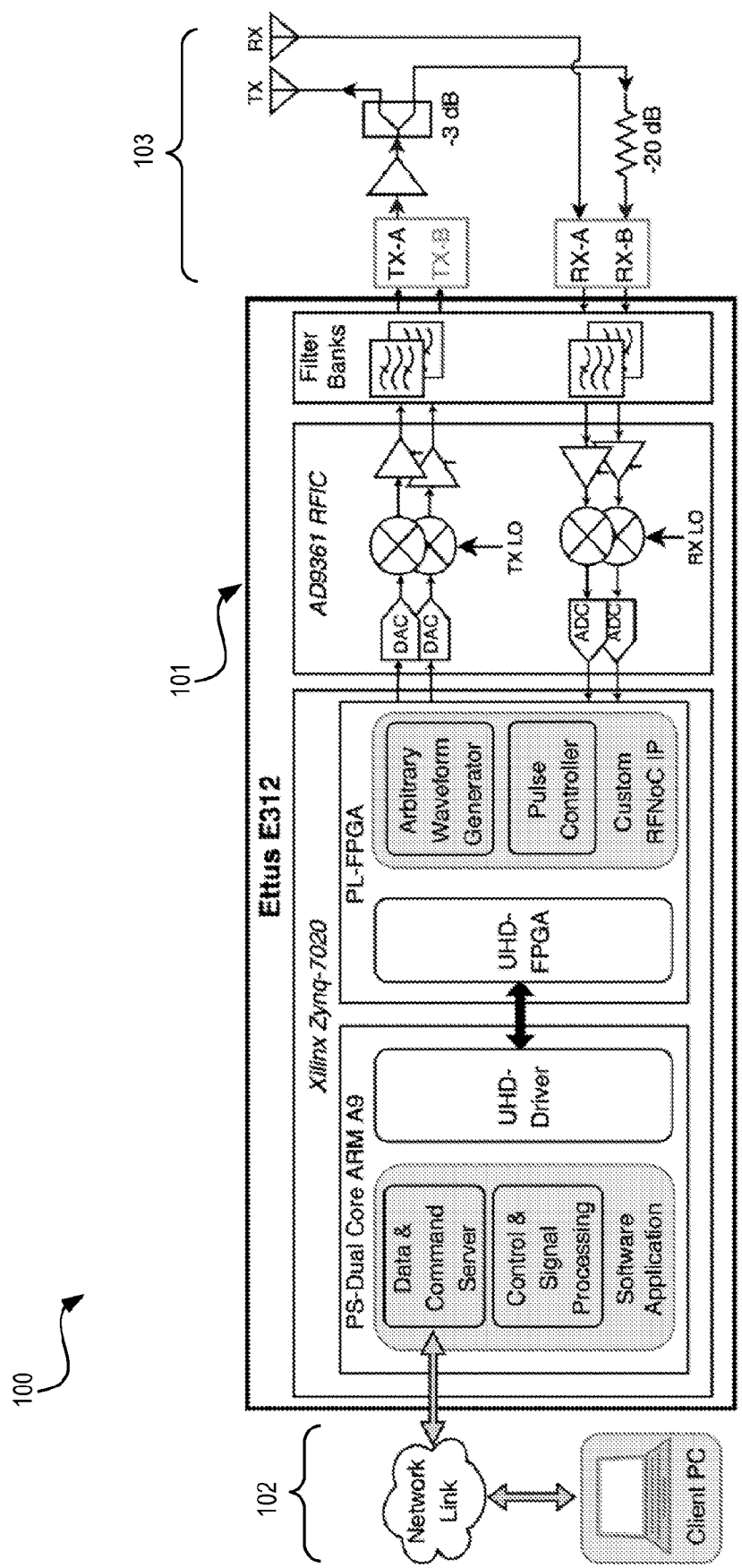
FIG. 1B illustrates components of an exemplary SDRadar system, in accordance with various embodiments.

With reference now to FIG. 1B, a SDRadar system 100 may comprise any suitable components for implementing a software defined radar. In various embodiments, SDRadar system 100 comprises software defined radio module 101 coupled to various network(s) and/or external computing resources 102. Software defined radio module 101 is also coupled to various amplification, signal routing, and/or antenna components 103.

Figure 2:
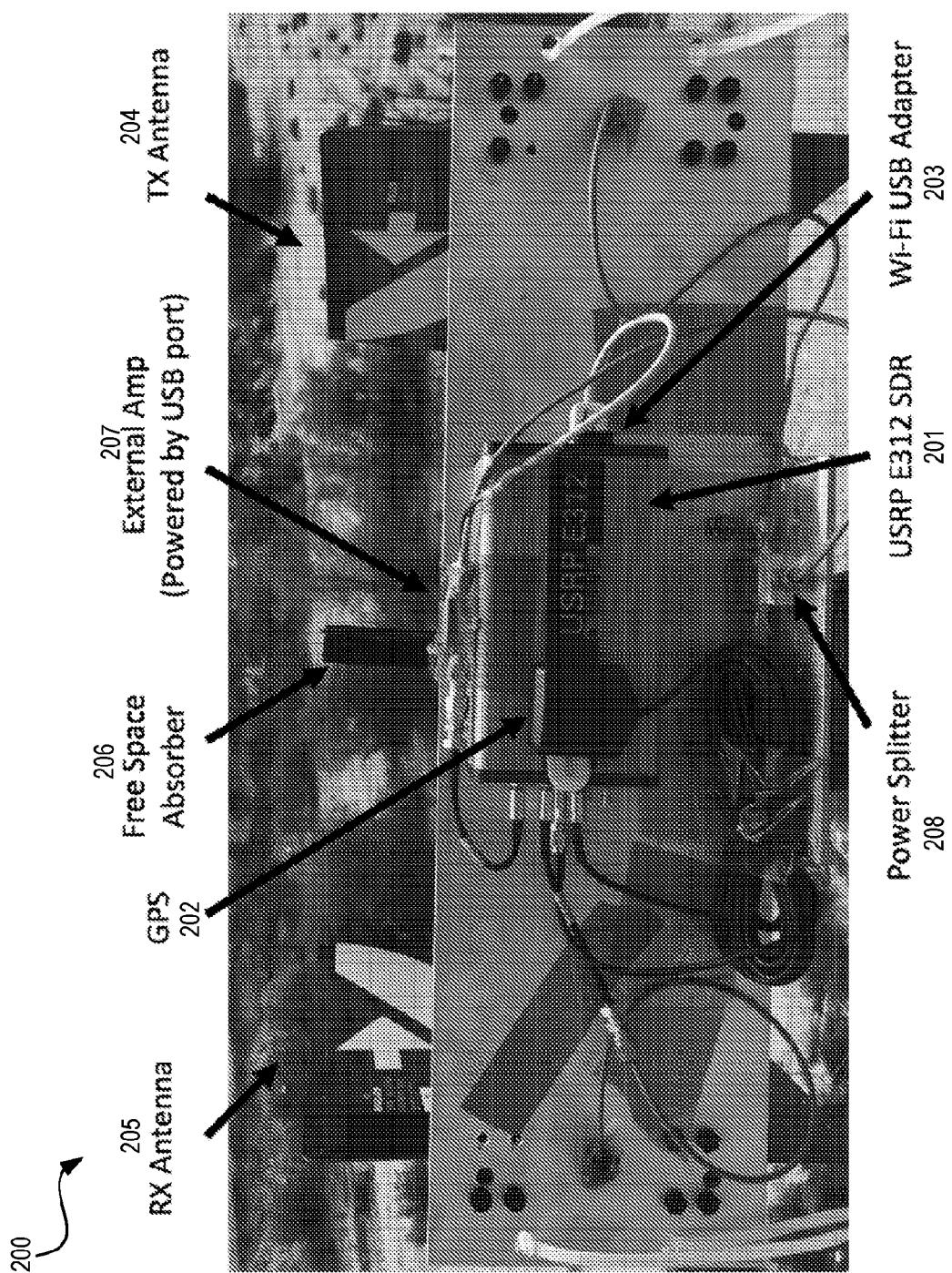
FIG. 2 illustrates components of a physical prototype of an exemplary SDRadar system, in accordance with various embodiments.

With reference to FIG. 2, in various embodiments, a SDRadar system 200 may comprise a software defined radio (e.g., a USRP E312 SDR) 201, a GPS module 202, a Wi-Fi adapter 203, a TX antenna 204, a RX antenna 205, a free space absorber 206, an external amplifier 207 (e.g., powered by a USB port), and a power splitter 208, together with such cabling and/or suitable interconnection components as are known in the art or hereinafter discovered or implemented. For example, various embodiments may comprise one or more of an Edimax EW-7811Un Wi-Fi adapter, an RFSPace TSA600 antenna, a MiniCircuits ZX60-V63+ external amplifier, a Minicircuits ZFRRC-123-S+ power splitter, and/or the like.

In various embodiments, system 100 and/or 200 may be implemented with suitable hardware, for example a USRP SDR platform and the RFNoC infrastructure developed by Ettus Research. RFNoC is a framework within which reconfigurable custom functional blocks in FPGA fabric can be created, easing design challenges encountered when trying to implement an ultra-wideband SDRadar in a SDR.

In various embodiments, the system utilizes customized AWG and pulse controller blocks that can transmit time-coherent pulses generated directly in the FPGA at the full Nyquist bandwidth as determined by the sample clock rate of the SDR. Within the RFNoC infrastructure, exemplary custom functional blocks are able to access the FPGA hardware-level timing and use the complete frontend instantaneous bandwidth of the hardware.

In various embodiments, to enable both remote configuration and acquisition of data, an exemplary software application (for example, a C++ application) for a general-purpose processor is utilized that implements a TCP/IP asynchronous server featuring a custom USRP controller class to handle and execute client requests.

In various embodiments, system 100 and/or 200 may utilize various antennas 204 and/or 205, for example two low cost TSA600 600-6000 MHz ultra-wideband tapered slot Vivaldi antennas from RFSpace Inc. may be used side-by-side in a pseudo-monostatic configuration for the transmit and receive channels. However, it will be apparent to those skilled in the art that any suitable number, type, and/or configuration of antennas may be utilized, as suitable.

In various embodiments, system 100 and/or 200 utilizes the USRP E312 SDR from Ettus Research. The E312 is a battery operated 2×2 MIMO capable embedded SDR with an Analog Devices AD9361 chip used as a frontend RF transceiver. The E312 offers a maximum instantaneous bandwidth of 54 MHz over a tunable center frequency range of 70 MHz to 6 GHz and 76 dB and 89.5 dB of programmable frontend gain for the RX and TX channels, respectively. The E312 has a Xilinx Zynq 7020 System on Chip (SoC), which consists of a 7 Series FPGA programmable logic (PL) board and a processing system (PS) with an ARM Cortex A9 866 MHz dual-core processor. The maximum transfer rate between the PL and PS is limited to 10 MS/s for 32-bit complex samples. An exemplary embodiment utilized a sample clock rate of 50 MHz for the FPGA PL. The AD9361 is a 2×2 RF transceiver with integrated 12-bit ADCs and DACs. It has two independent LOs: one shared by the receive channels (RX-A and RX-B), and one shared by the transmit channels (TX-A and TX-B). The chip's RX subsystem performs DC offset correction, quadrature correction, and digital filtering. Exemplary embodiments utilize the serial peripheral interface (SPI) control to configure the AD9361 chip appropriately for successful coherent SWW reconstruction. By modifying the register map of the AD9361 so that multi-chip synchronization (MCS) is enabled, the phase relationship between LO sharing channels remains constant while switching between them allowing for coherent calibration. Moreover, in general, in accordance with principles of the present disclosure multi-channel USRP devices can be configured such that deterministic relationships exist among channels, allowing for coherent loopback calibration. In single channel SDRs, however, an external switching network, controllable via general purpose input/output (GPIO) or other input/output (IO) bus may be utilized for coherency.

In various embodiments, to reduce internal electronic coupling and provide additional gain, systems 100 and/or 200 utilize an external amplifier added to the TX path. This increases the maximum output power of an exemplary SDRadar from 10 dBm, the maximum output power of the E312, to about 20 dBm. However, any suitable amount of additional and/or external amplification may be applied, as desired. An exemplary embodiment uses one of the E312's USB ports to power an external amplifier. An exemplary embodiment connects the second RX channel, RX-B, to the TX path through a power splitter and 20 dB attenuator as a phase-coherent signal reference as described in Equation (5) below. FIG. 1B illustrates the complete SDRadar implementation of system 100 and an exemplary physical system, system 200, is shown in FIG. 2

Figure 3:
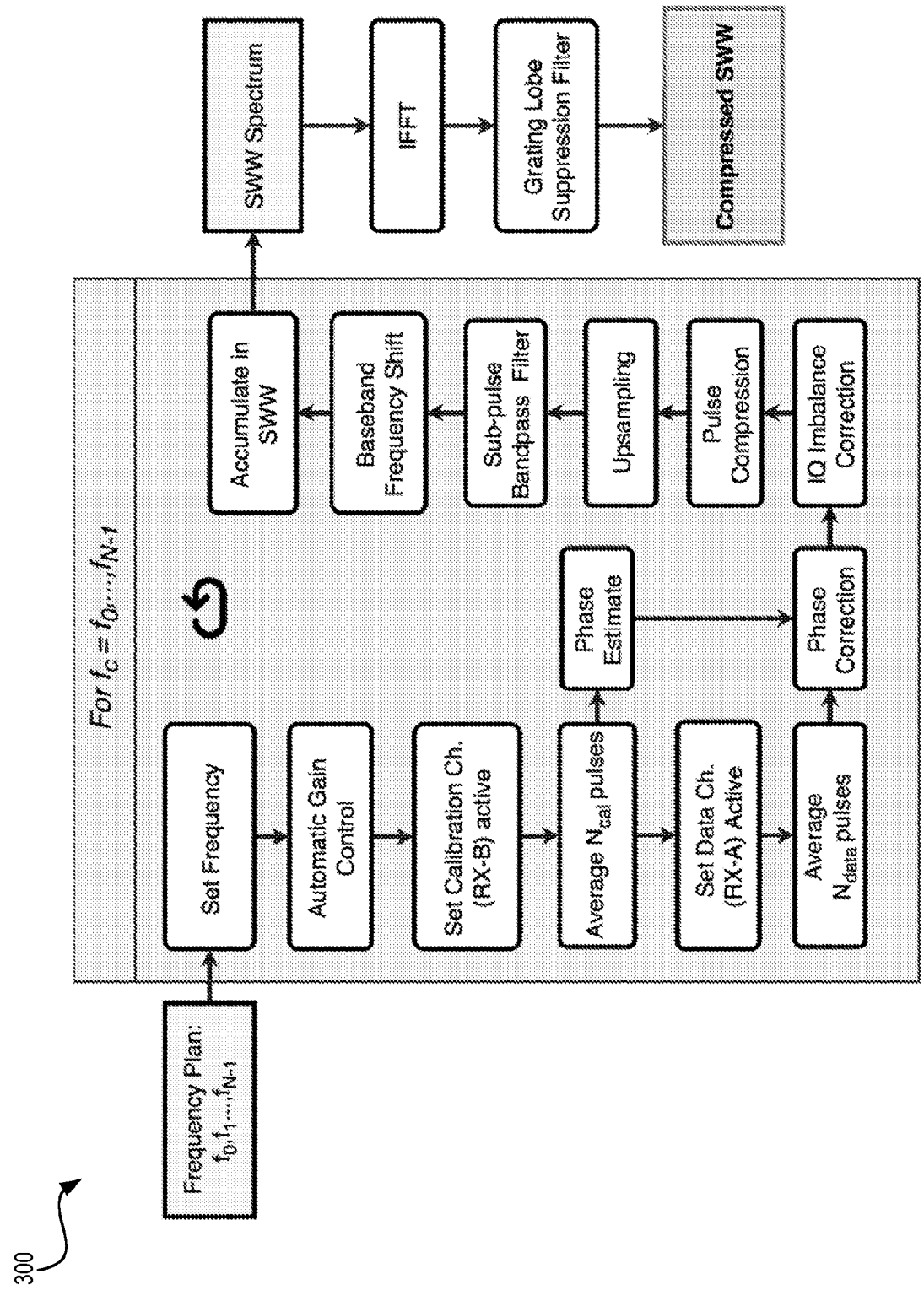
FIG. 3 illustrates an exemplary method for data acquisition and synthetic wideband waveform reconstruction using frequency stacking, in accordance with various embodiments.

In various embodiments, in operation of system 100 and/or 200, for each sub-pulse, configuration meta-data is saved to a file that is used by the frequency stacking algorithm to perform the SWW reconstruction. Attitude, position, and timing data from the E312's integrated 9-axis Inertial Measurement Unit (IMU) and GPS are also stored for each pulse. FIG. 3 details an exemplary data collection and processing architecture and algorithm(s) 300 implemented in system 100 and system 200. In various exemplary embodiments, a frequency collection plan is sent wirelessly to system 100 and/or system 200 (for example, from a remote system such as a remote client PC) to initialize synthetic wideband operation; alternatively, system 100 and/or system 200 may contain and/or be programmed with a frequency collection plan or plans, and a frequency collection plan selection may be made by a user of system 100 and/or 200 or via a message received thereat. System 100 and/or 200 commences a synthetic wideband frequency collection at each of the frequencies defined in the frequency collection plan by stepping through each RF frequency, configuring gain settings via automatic gain control, collecting and/or averaging one or more calibration sub-pulses, switching channels and collecting and/or averaging one or more data sub-pulses. The calibration sub-pulses are used to estimate and correct offset RF phase, I/Q channel imbalance, and internal electronic signal path variations. The sub-pulses are accumulated in SWW using an exemplary described method and a grating lobe suppression filter is formed and applied to remove signal processing artifacts due to synthetic wideband processing, resulting in the compressed SWW high resolution radar echo. The frequency stacking algorithm and grating lobe suppression may be implemented within system 100/200 components, for example in C++ on the embedded SDR board, or externally, for example on an external computing system. In this manner, processing of system 100/200 data may be made modular, scalable, and/or distributed.

In various embodiments, exemplary systems, such as system 100 or system 200, utilize a synthetic wideband waveform reconstruction technique as disclosed hereinbelow.

Synthetic Wideband Waveform Reconstruction

A glossary of selected variables utilized herein is presented in Table 1.

TABLE 1

| Symbol | Description |
|---|---|
| $f_s$ | Baseband sampling rate |
| $B_i$ | Sub-pulse waveform instantaneous bandwidth |
| $T_p$ | Sub-pulse waveform length |
| L | Number of samples per Sub-pulse waveform $L = f_s \cdot T_p$ |
| t | Continuous time variable |
| f | Continuous frequency variable |
| $t_m$ | Discrete time variable, indexed by $m$ where $t_m = \dfrac{m}{f_s}$ |
| $f_k$ | Discrete frequency variable, indexed by $k$ where $f_k = k\dfrac{f_s}{L}$ |
| K | Chirp rate where $K = \dfrac{B_i}{T_p}$ |
| A(t) | Pulse amplitude weighting function |
| $\Delta f_c$ | Sub-pulse center frequency spacing |
| N | Total number of sub-pulses, indexed by $n \in [0, N-1]$ |
| $f_{c0}$ | Center frequency of first sub-pulse |
| $f_n$ | Center frequency of $n^{th}$ sub-pulse where $f_n = f_{c0} + n\Delta f_c$ |
| $\Delta f_n$ | Baseband frequency offset of $n^{th}$ sub-pulse where $\Delta f_n = \left(n - \dfrac{N-1}{2}\right)\Delta f_c$ |
| $\Delta T_n$ | Baseband sub-pulse time offset where $\Delta T_n = \Delta f_n / K$. |
| $B_s$ | Bandwidth of sub-pulse bandpass filters |
| % $BW_{eff}$ | Bandwidth efficiency where % $BW_{eff} = (B_s/B_i) \times 100$ |
| $BW_t$ | Total bandwidth of SWW |

In various embodiments, the methods obtain high range resolution performance by coherently combining a series of sub-pulses to form a wideband SWW. A common method for producing a SWW, often called stepped-chirp, aims to reconstruct a wideband linear frequency modulated (LFM) chirp from a set of narrowband LFM chirp subpulses, which is then pulse compressed to achieve high range resolution Consider a discrete-time baseband complex LFM chirp waveform $w[t_m]$ with instantaneous bandwidth B, and pulse length $T_p$, which is sampled according to the Nyquist theorem at sampling rate $f_s$ and has support over the interval $$t_m \in \left\{-\frac{T_p}{2}, \frac{T_p}{2}\right\}.$$

$$w[t_m] = A[t_m]e^{j\pi K t_m^2} \quad (1)$$

Where $K=B_i/T_p$ is the chirp rate and $A[T_m]$ is a pulse amplitude weighting function. For a nominal rectangular pulse, we may take $A[T_m] = \text{rect}\,[t_m/T_p]$ Using the Whittaker-Shannon interpolation formula, the continuous time waveform w(t) produced after digital to analog conversion of $w[t_m]$ can be represented as $$w(t) = \sum_{m=-\infty}^{\infty} w[t_m]\frac{\sin(\pi f_s(t - t_m))}{\pi f_s(t - t_m)} \quad (2)$$

A series of N linear FM chirp sub-pulses sn(t) each have bandwidth $B_i$, pulse length $T_p$ and center carrier frequency $f_n = f_{c0} + n\Delta f_c$ for n=0, . . . , N−1 where $\Delta f_c$ is the sub-pulse frequency spacing. We assume that each sub-pulse is transmitted and received in a stop-and-go fashion sufficiently separated in time so that sub-pulses can be treated as orthogonal and that target echoes are unambiguous. Sub-pulse doppler shifts due to relative target motion are not considered herein. Due to the generally non-coherent TX and RX LO phase relationship in many commer-cial radio platforms, including USRP SDRs, we consider terms for the TX phase $\phi_{t,n}$ and RX phase $\phi_{r,n}$ errors present in each sub-pulse. We define the total contribution of these random phase errors after up/down-conversion as $\phi_{e,n} = \phi_{t,n} - \phi_{r,n}$. Then $$s_n(t) = w(t) e^{j2\pi f_n t} e^{j\phi_{t,n}} \quad (3)$$

Let $z_n(t)$ be the echo of the $n^{th}$ sub-pulse from a scatter located at a distance $R_s$ after demodulation and downconversion to baseband $$z_n(t) = s_n\left(t - \frac{2R_s}{c}\right) e^{-j2\pi f_n t} e^{-j\phi_{r,n}} \quad (4)$$

Substituting Equation (3) and after the signal is digitized with $\Sigma\Delta$ ADCs, we get the discretized signal $z_n[t_m]$ $$z_n[t_m] = w\left[t_m - \frac{2R_s}{c}\right] e^{-j2\pi f_n \frac{2R_s}{c}} e^{-j\phi_{e,n}} \quad (5)$$

By performing a frequency shift, time shift, phase correction, and sinc interpolation with a Bs bandwidth filter on the sub-pulse echoes, a synthetic wideband signal $z[t_m]$ that has the characteristics of a wideband LFM chirp may be reconstructed. These operations can be expressed as a set of filters with coefficients $g_n[t_m]$ given as $$g_n[t_m] = \frac{1}{2\pi\Delta f_c} \frac{\sin[\pi B_s(t_m - \Delta T_n)]}{\pi(t_m - \Delta T_n)} e^{j\pi\Delta T_n \Delta f_n} e^{j2\pi(t_m - \Delta T_n)\Delta f_n} \quad (6)$$

In various embodiments, the filters are applied to each frequency shifted baseband sub-pulse and the outputs are summed to obtain the SWW $z[t_m]$ $$z[t_m] = \sum_{n=0}^{N-1} \left(z_n[t_m] e^{j2\pi\Delta f_n t_m} e^{-j\phi_{e,n}}\right) \circledast g_n[t_m] \quad (7)$$

Where $\circledast$ denotes the convolution operator.

With the assumption of a stationary platform throughout the duration of each frequency sweep, the SWW reconstruction is equivalent to frequency-domain stacking of compressed sub-pulse spectra. If we consider pulse compression of the received echo SWW $z[t_m]$ by matched filtering with a SWW $v[t_m]$ similarly constructed from a series of N phase-coherent reference sub-pulses $v_n[t_m]$, i.e.:

$$v_n[t_m] = w[t_m] e^{j\phi_{e,n}} \quad (8)$$

which is equivalent to the expression in Equation (5) with $R_s = 0$. The output of the wideband matched filter $d[t_m]$ is the pulse-compressed SWW and is given by the cross-correlation $$d[t_m] = z[t_m] \circledast v^*[-t_m] \quad (9)$$

$D[f_k]$, $z_n[f_k]$, and $V_n[f_k]$ is defined as the discrete Fourier transforms of $d[t_m]$, $z_n[t_m]$, and $v_n[t_m]$ respectively and $g_n[f_k]$ as the frequency response of the $g_n[t_m]$ filters given in Equation (6). Now $d[t_m]$ may be represented in the frequency domain as $$D[f_k] = \sum_n Z_n[f_k - \Delta f_n] G_n[f_k] \sum_{n'} V_{n'}^*[f_k - \Delta f_{n'}] G_{n'}^*[f_k] \quad (10)$$

Noting that $G_n[f_k]$ only has support over $f \in [\Delta f_n - B_s/2, \Delta f_n + B_s/2]$ and is zero elsewhere, we can simplify this expression as $$D[f_k] = \sum_n Z_n[f_k - \Delta f_n] V_n^*[f_k - \Delta f_n] G_n[f_k] G_n^*[f_k] \quad (11)$$

Time-independent complex exponential terms in Equation (6) and hence in $G_n[f_k]$ will cancel due to multiplication by conjugate phase. This then simplifies to $$D[f_k] = \sum_n Z_n[f_k - \Delta f_n] V_n^*[f_k - \Delta f_n] \text{rect}\left[\frac{f_k - \Delta f_n}{B_s}\right] \quad (12)$$

Note, the exponents of the coefficients are removed. Because $z_n[t_m]$ and $v_n[t_m]$ are both baseband complex lowpass signals, if we represent the set of lowpass sub-pulse matched filter outputs $d_n[t_m] = z_n[t_m] \circledast v^*_n[-t_m]$ with their Fourier transform $D_n[f_k] = Z_n[f_k] V^*_n[f_k]$, then $$D[f_k] = \sum_n D_n[f_k - \Delta f_n] \text{rect}\left[\frac{f_k - \Delta f_n}{B_s}\right] \quad (13)$$

or in the time domain $$d[t_m] = \sum_n \left(d_n[t_m] \circledast \frac{\sin[\pi B_s t_m]}{\pi t_m}\right) e^{j2\pi\Delta f_n t_m} \quad (14)$$

In various embodiments, this exemplary method performs pulse-compression by applying a matched filter to each baseband sub-pulse prior to reconstruction. This has the dual benefit of both eliminating the need to perform compression on a massively up-sampled signal, thus freeing computational resources, and allowing parallel processing of the baseband sub-pulses in real time. Under the aforementioned assumptions of a stationary platform and no inter-sub-pulse doppler shifts, this exemplary frequency stacking method achieves significant speed improvements by focusing on compressed SWW reconstruction from the phase coherent matched filter outputs of sub-pulses, making real-time implementation feasible in commercial SDR platforms. Furthermore, this exemplary method is independent of the properties of the LFM chirp and can be applied equivalently to produce a SWW with bandwidth $$\delta_r \cong \frac{c}{2N\Delta f_c}.$$

It will be appreciated that while exemplary embodiments are presented herein in context with LFP chirp waveforms, principles of the present disclosure may advantageously be applied to other waveforms, for example nonlinear frequency modulated waveforms with arbitrary spectral shape (e.g., hamming weighting), pseudo-random noise sequence waveforms, and/or the like.

In Algorithm 1, the discrete-time SWW reconstruction from sampled baseband signals $z_n[t_m]$ and $v_n[t_m]$ are expressed. We introduce $L=f_s \cdot T_p$ as the number of sub-pulse samples.

---

Algorithm 1 Frequency Stacking

1: For n = 0, ..., N − 1, compress $z_n[t_m]$ with $v_n[t_m]$ at baseband to obtain the series of compressed sub-pulses
$d_n[t_m] = z_n[t_m] \circledast v_n^*[-t_m]$. Take the discrete Fourier transform (DFT) of each and compute the compressed spectra $D_n[f_k] = Z_n[f_k]V_n^*[f_k]$ 2: Filter the baseband pulse in the frequency domain to bandwidth $B_s = \Delta f_c$ by element-wise multiplication with $\text{rect}\left[\dfrac{f_k}{B_s}\right]$. (Note that in order to reduce spectral notches, we require that $B_s \geq B_i$.)

3: Append/pre-append zeros in frequency domain symmetrically about DC to upsample sufficiently to $L_{up} \geq N * L$.

4: Frequency shift each sub-pulse to $\Delta f_n$

5: Sum the n frequency-shifted compressed sub-pulses.

$$D[f_k] = \sum_{n=0}^{N-1} D_n[f_k - \Delta f_n] \text{ rect}\left[\frac{f_k - \Delta f_n}{B_s}\right] \quad (15)$$

6: Perform an IFFF to obtain the compressed SWW $d[t_m]$ $$d[t_m] = \frac{1}{L_{up}} \sum_{k=0}^{L_{up}-1} D[f_k] e^{j2\pi km/L_{up}} \quad (16)$$

---

Because SDR hardware cannot in general be assumed to be phase-coherent, exemplary embodiments ensure that a phase-coherent reference signal $v_n[t_m]$ is obtained, for example through external loopback or other suitable approach. Due to random phase errors caused by ambiguous PLL divider states in many RF transceivers used for communications, the reference $v_n[t_m]$ is accurately measured such that it is phase-coherent with $z_n[t_m]$. Depending on the signal-to-noise ratio (SNR) of $v_n[t_m]$, some embodiments in step 1 of Algorithm 1 use this reference only to estimate and remove the random phase error of each sub-pulse, via conjugate-phase product, and perform compression directly with the noiseless discrete-time reference waveform $w[t_m]$.

Motion Compensation

Various exemplary embodiments are configured to be compatible with and/or account for motion of a sensing platform. For example, the platform may follow an arbitrary, but known, path. The platform may be considered stationary for the duration of transmission and reception of each individual sub-pulse. However, platform motion is considered between sub-pulses such that the platform's position at the time when sub-pulse n is transmitted is $p_n=(x_n, y_n, x_n)$. Without loss of generality, a coordinate system is defined with the origin at the platform position when the first sub-pulse is transmitted $p_0=(0, 0, 0)$ and oriented such that they axis points along the antenna line of sight. The appropriate choice of a platform reference position is dependent on the nature of the platform motion and should be chosen such that the mean path deviation from the reference is 0. For a multi-rotor UAV that attempts to hover at a stationary position for the duration of the SWW collection, defining the path deviation with respect to the position at which the first sub-pulse is transmitted is appropriate. However, for a platform moving with a constant velocity, the SWW collection can be treated as a sub-aperture and defining path deviations relative to the sub-aperture center i.e. the position at sub-pulse N/2 is more appropriate.

$p_t$ is defined as the coordinates of a reference point target located at (0, $y_t$, 0) (ie. along the antenna line of sight vector when the platform is at position $p_0$). This reference point need not correspond to any physical scattering object. The ranges are now defined to this reference from the origin and for sub-pulse n as $R_{0,t}=\|p_0-p_t\|_{l2}$ and $R_{n,t}=\|p_n-p_t\|_{l2}$ respectively where $\|(.)\|_{l2}$ is the l2 or Euclidean norm. Now the slant range path error $\Delta R_n$ is given as $$\Delta R_n = R_{n,t} - R_{0,t} = \sqrt{x_n^2 + (y_t - y_n)^2 + z_n^2} - y_t \quad (17)$$

Now the following correction is made for the sub-pulse matched filter defined in Equation (8) to obtain the motion-compensated sub-pulse matched filter $\tilde{v}_n[t_m]$ $$\tilde{v}_n[t_m] = v_n[t_m] \circledast \delta\left[t_m - \frac{2\Delta R_n}{c}\right] \exp\left(-j2\pi f_n \frac{2\Delta R_n}{c}\right) \quad (18)$$

or in the frequency domain $$\tilde{V}_n[f_k] = V_n[f_k] \exp\left[-j2\pi \frac{2\Delta R_n}{c}(f_k + f_n)\right] \quad (19)$$

Now after substituting $\tilde{v}_n[t_m]$ in this expression for $v_n[t_m]$ in Equation (9) and $\tilde{V}_n[f_k]$ for $V_n[f_k]$ in the discussion of SWW reconstruction above, the SWW reconstruction is performed as described previously This assumption is valid for cases when the magnitude of the inter-sub-pulse path deviations are small relative to the nominal reference target range $R_{0,t}$. The effectiveness of this platform motion compensation is explored further hereinbelow.

Consider a second point target located at $p_{t'}$. The slant range to this target from the platform reference location is $R_{0,t'}=\|p_0-p_{t'}\|_{l2}$. The exemplary matched filter motion correction utilizes the assumption that $$R_{n,t'} \approx \Delta R_n + R_{0,t'} \quad (20)$$

remains valid for any target range of interest in the radar scene.

Grating Lobe Suppression

In addition to motion compensation, in various embodiments, exemplary systems and methods utilize grating lobe suppression. The Fresnel ripples that occur at the edges of the LFM chirp's and other waveform's spectra produce well documented grating-lobes that appear at intervals of $c/2\Delta f_c$ in the pulse-compressed SWW. Several techniques exist for mitigating grating-lobes that result from the stepped-waveform SWW reconstruction, such as overlapping sub-pulses, use of window functions, and/or spectral weighting techniques. Increasing sub-pulse overlap (or equivalently decreasing the frequency spacing $\Delta f_c$ and bandpass filter bandwidth $B_s$) can reduce grating lobes but at the cost of sub-pulse bandwidth efficiency (% $BW_{eff}=(B_s/B_t)*100$) as well as a loss of total bandwidth $BW_t$ when N and $B_i$ remain fixed. In various embodiments, further improvements are obtained by windowing each sub-pulse with a tapered cosine or Tukey window, which reduces far out grating lobe levels.

The flexibility of exemplary SDRadar systems allows for multiple methods of grating lobe suppression to be combined in a manner that maximizes performance. While any suitable techniques may be utilized, exemplary systems disclosed herein utilize one or more of the following four techniques: (i) overlapping sub-pulses, (ii) sub-pulse window functions, (iii) non-uniform frequency spacing, and (iv) grating lobe suppression with an inversion filter. These exemplary approaches may be selected because they have minimal effects on the total time needed to complete an entire frequency sweep. The characteristics of grating lobes and effectiveness of these different techniques in mitigating them are further explored below.

Non-Uniform Frequency Spacing

The impulse-like shape of the grating-lobes is due to periodicity in the SWW spectrum caused by uniform spacing of sub-pulses in the frequency domain by a fixed value $\Delta f_c$. By spacing sub-pulses at non-uniform frequencies, in various embodiments, the energy in the grating-lobes is spread out in the resulting non-uniform synthetic wideband waveform (NU-SWW). In an exemplary method, we define a non-uniform frequency spacing for each sub-pulse $\Delta f_{c,n}(u)$ for a uniform random variable $U_n(u)$ defined over a sample space with points u such that $$\Delta f_{c,n}(u) = \Delta f_c + U_n(u) \tag{21}$$

Those skilled in the art will recognize the difficulty of implementing such a technique in a traditional radar system; however, this technique may readily be implemented in an exemplary SDRadar system.

Grating Lobe Suppression Filter

In various embodiments, the frequency stacking algorithm is repeated to construct a reference SWW, $W[f_k]$, from either an RX calibration channel data or transmit waveform samples. From this, a numerically calculated grating-lobe suppression (GLS) filter is obtained that can be applied to the SWW to shape the reconstructed spectrum and correct for the hardware transfer function.

Let $M[f_k]$ represent the frequency response of some ideal wideband compressed signal (for example, the spectrum of a compressed wideband LFM chirp) with spectral sup-port across the reconstructed total bandwidth $BW_t = N \times B_s$. A filter $H_z[f_k]$ is defined as $$H_z[f_k] = \begin{cases} \frac{M[f_k]}{W[f_k]} \text{rect}\left[\frac{f_k}{BW_t}\right], & W[f_k] \neq 0 \\ 0, & \text{otherwise} \end{cases} \tag{22}$$

Normalizing for unit filter gain, an exemplary grating-lobe suppression filter is obtained $\overline{H}_z[f_k]$ $$\overline{H}_z[f_k] = \frac{H_z[f_k]}{H_z[0]} \tag{23}$$

Apply the inversion filter to $D[f_k]$ to obtain the corrected wideband synthesized pulse spectrum $$\overline{D}[f_k] = \overline{H}_z[f_z] D[f_k] \tag{24}$$

and take the IFFT to obtain the corrected synthesized compressed pulse $\overline{d}[t_m]$.

Results—Loopback Verification

An exemplary embodiment of system 200 was tested in a loopback configuration with the RX-A data connected directly to the output of the split TX-A channel through a 20 dB attenuator. Each sub-pulse has an instantaneous bandwidth $B_f = 50$ MHz (sample rate $f_s = 50$ Msps). A numerically calculated GLS filter as described above is applied to perform spectrum shaping of the SWW. The filter is derived from the calibration channel SWW and therefore has the property of both spectral discontinuity removal as well as inversion of the digital subsystem transfer function common to both channels. The relationship between the two channels was confirmed to be deterministic through testing and channel swapping.

Performance of system 200 across the entire 6 GHz tunable frontend frequency range of the E312 is demonstrated. The range resolution capabilities of system 200 remain nearly identical to that of an ideal wideband chirp for a given bandwidth as more sub-pulses are added to the reconstruction. Thus, across the entire frontend tuning capability of the SDRadar, bandwidth may be increased or decreased arbitrarily without any loss in performance as compared to theoretical expectations.

As expected, the grating-lobe level increases with the number of sub-pulses used. The exemplary filter suppresses far-out grating-lobes to below the noise floor and significantly reduces grating-lobe levels near the main-lobe, with the first grating-lobe suppressed by 15 dB. Further results are shown in Tables II, III, IV, V, and VI, below.

TABLE II

SWW, 96% BW EFFICIENCY, $BW_t$ = 5328 MHz

| | | GLS Filter | | |
|---|---|---|---|---|
| Parameter | Theoretical | None | Rect | Hamming |
| PGL | n/a | −21.3 dB | −34.7 dB | −34.9 dB |
| PSL | −13.3 dB | −14.6 dB | −14.1 dB | −20.2 dB |
| −6 dB main lobe | 3.3 cm | 3.4 cm | 3.4 cm | 5.2 cm |

TABLE III

SWW, 80% BW EFFICENCY, $BW_t$ = 5328 MHz

| | | GLS Filter | | |
|---|---|---|---|---|
| Parameter | Theoretical | None | Rect | Hamming |
| PGL | n/a | −25.6 dB | −34.7 dB | −34.8 dB |
| PSL | −13.3 dB | −14.6 dB | −14.2 dB | −20.4 dB |
| −6 dB main lobe | 3.3 cm | 3.4 cm | 3.4 cm | 5.2 cm |

TABLE IV

NU-SWW, 80% BW EFFICIENCY, $BW_t$ = 5328 MHz

| | | GLS Filter | | |
|---|---|---|---|---|
| Parameter | Theoretical | None | Rect | Hamming |
| PGL | n/a | −22.7 dB | −38.0 dB | −38.1 dB |
| PSL | −13.3 dB | −14.6 dB | −14.1 dB | −20.6 dB |
| −6 dB main lobe | 3.3 cm | 3.4 cm | 3.4 cm | 5.2 cm |

TABLE V

SWW, 50% BW EFFICENCY, $BW_t$ = 5328 MHz

| | | GLS Filter | | |
|---|---|---|---|---|
| Parameter | Theoretical | None | Rect | Hamming |
| PGL | n/a | −30.6 dB | −38.9 dB | −38.9 dB |
| PSL | −13.3 dB | −12.9 dB | −14.2 dB | −20.7 dB |
| −6 dB main lobe | 3.3 cm | 3.4 cm | 3.4 cm | 5.2 cm |

TABLE VI

NU-SWW, 50% BW EFFICENCY, $BW_t$ = 5328 MHz

| | | GLS Filter | | |
|---|---|---|---|---|
| Parameter | Theoretical | None | Rect | Hamming |
| PGL | n/a | −30.5 dB | −47.6 dB | −52.3 dB |
| PSL | −13.3 dB | −14.7 dB | −14.0 dB | −20.6 dB |
| −6 dB main lobe | 3.3 cm | 3.4 cm | 3.4 cm | 5.2 cm |

Tables II through VI summarize key performance benchmarks, namely, peak grating-lobe (PGL) level, peak sidelobe (PSL) level and −6 dB main lobe width for five different operating modes of system 200 and compare the performance of Rect and hamming grating-lobe suppression filters. The results are obtained from the average of 100 pulses and are compared to a theoretical wideband LFM chirp having the some total bandwidth as the reconstructed SWW. For applications requiring grating-lobes levels <−50 dB and able to tolerate BW efficiency of 50%, systems 100 and/or 200 can meet requirements with range resolution equivalent to that of an identical bandwidth theoretical wideband LFM chirp.

Results: Reflector Resolution Tests

Figure 4A:
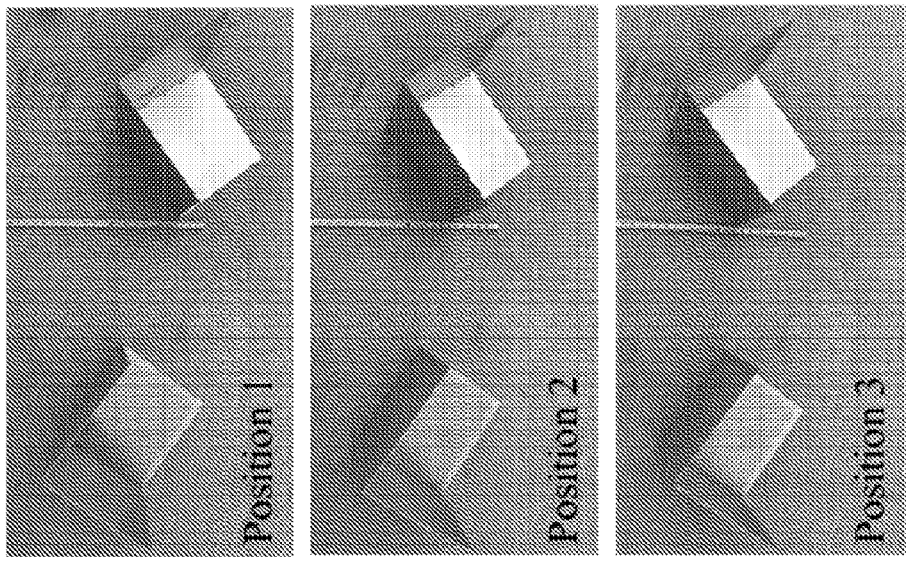
FIG. 4A illustrates an exemplary SDRadar system and test reflector arrangement, in accordance with various embodiments.
Figure 4A:
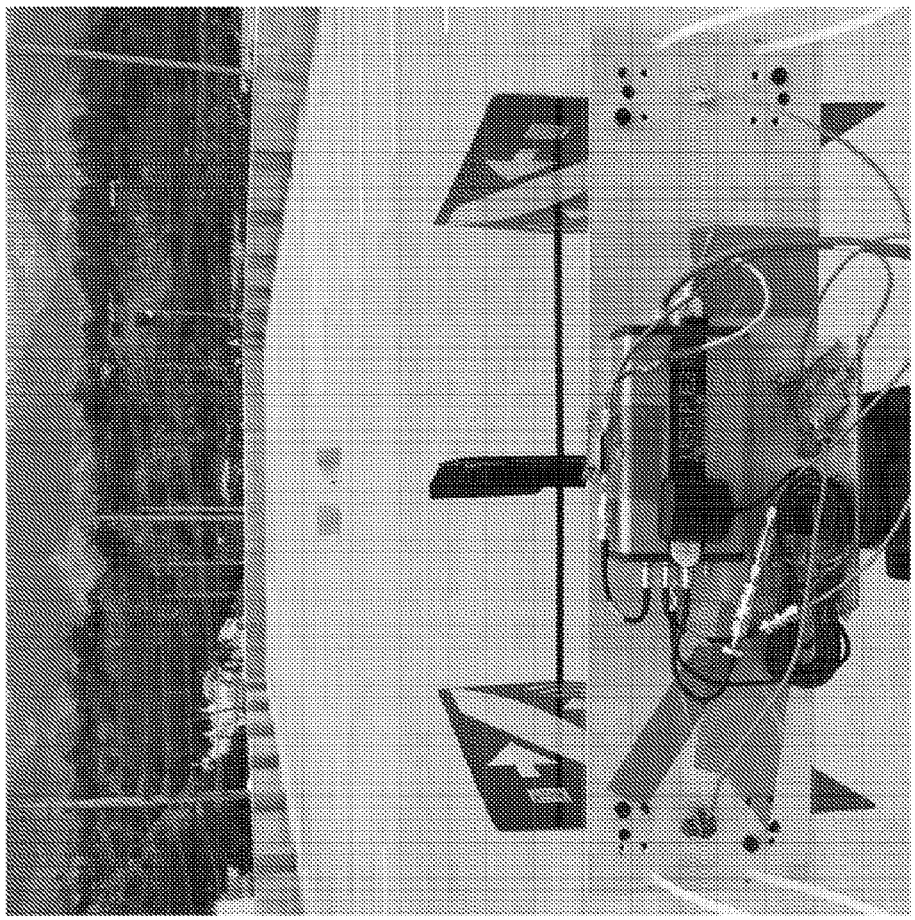

Capabilities of system 200 to resolve objects are disclosed. In order to more precisely characterize the performance of the system 200, a resolution test using two corner reflectors with very little separation is conducted. Here we present distinct detection of the two reflectors for measured slant-range separations as small as about 6 cm. The radar line of sight scene is shown in FIG. 4A. The three two-reflector positions tested are also shown. In each subsequent scene the closer reflector (right) is moved backwards along the ground in increments of about 7.62 cm as indicated by the yellow tape measure.

Figure 4B:
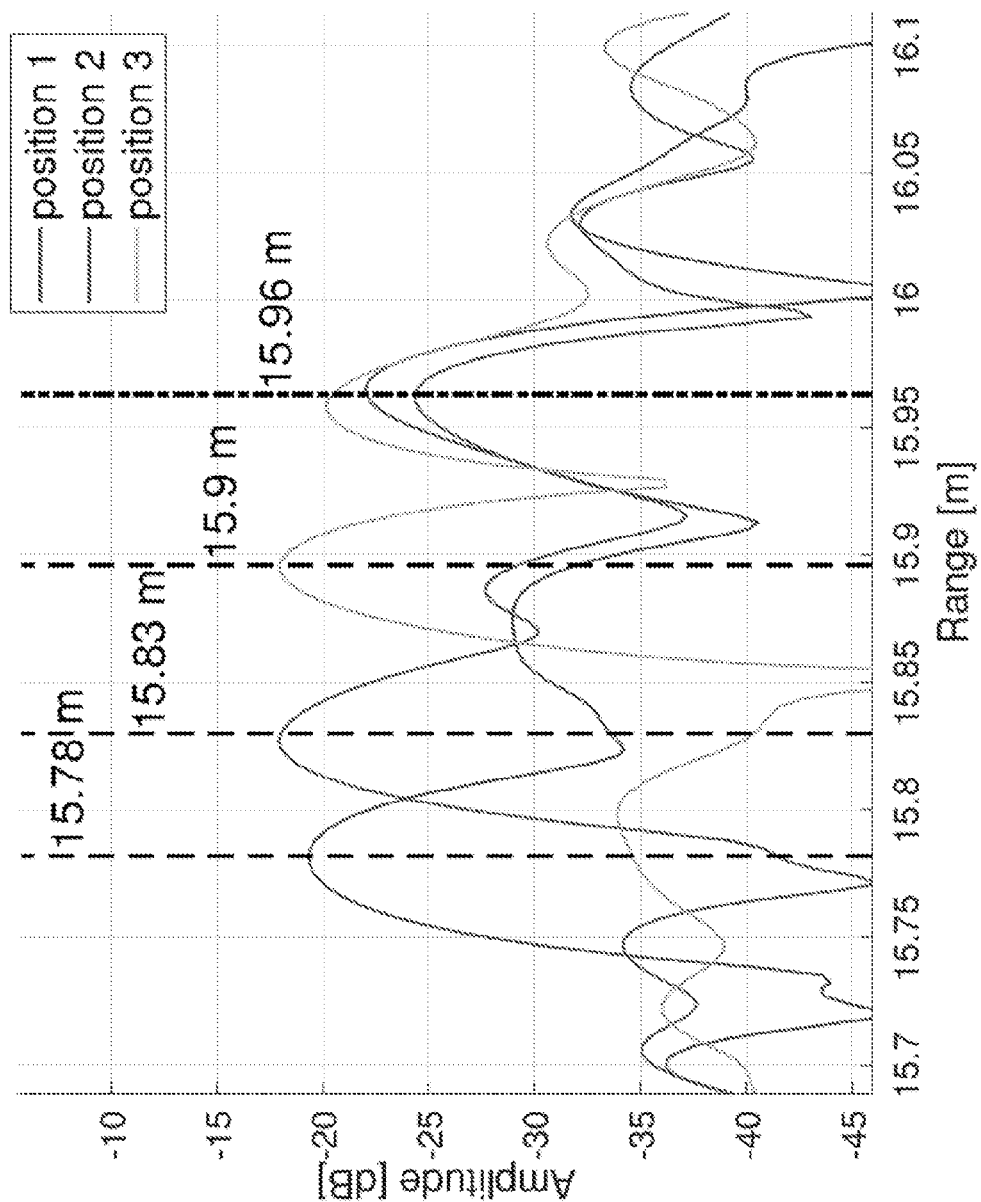
FIG. 4B illustrates operational SDRadar performance for the configurations illustrated in FIG. 4A, in accordance with various embodiments.

In this test, a 5.3 GHz bandwidth NU-SWW was synthesized from 211 50 MHz bandwidth sub-pulses with 50% BW Efficiency from 600 MHz-5.8522 GHz. The measured reflector peak detections are given in Table VIII with the corresponding echoes plotted in FIG. 4B. The lighter dashed lines indicate the peak locations of the near reflector, which was moved incrementally while the darker dashed-dotted line indicates the approximate mean of the far reflector peak detections for the three arrangements tested. The maximum reflection in the compressed SWW is normalized to a 0dB reference.

TABLE VIII

SECOND REFLECTOR RESOLUTION
TEST MEASURED PEAK SEPARATION

| | Reflector Scene Setup | | |
|---|---|---|---|
| Measured Range | Position 1 | Position 2 | Position 3 |
| Near Reflector (m) | 15.7823 | 15.8267 | 15.8962 |
| Far Reflector (m) | 15.9656 | 15.9628 | 15.9573 |
| Separation (cm) | 18.33 | 13.61 | 6.11 |
| True Separation (cm) | 21.6 | 14.0 | 6.4 |

Figure 5A:
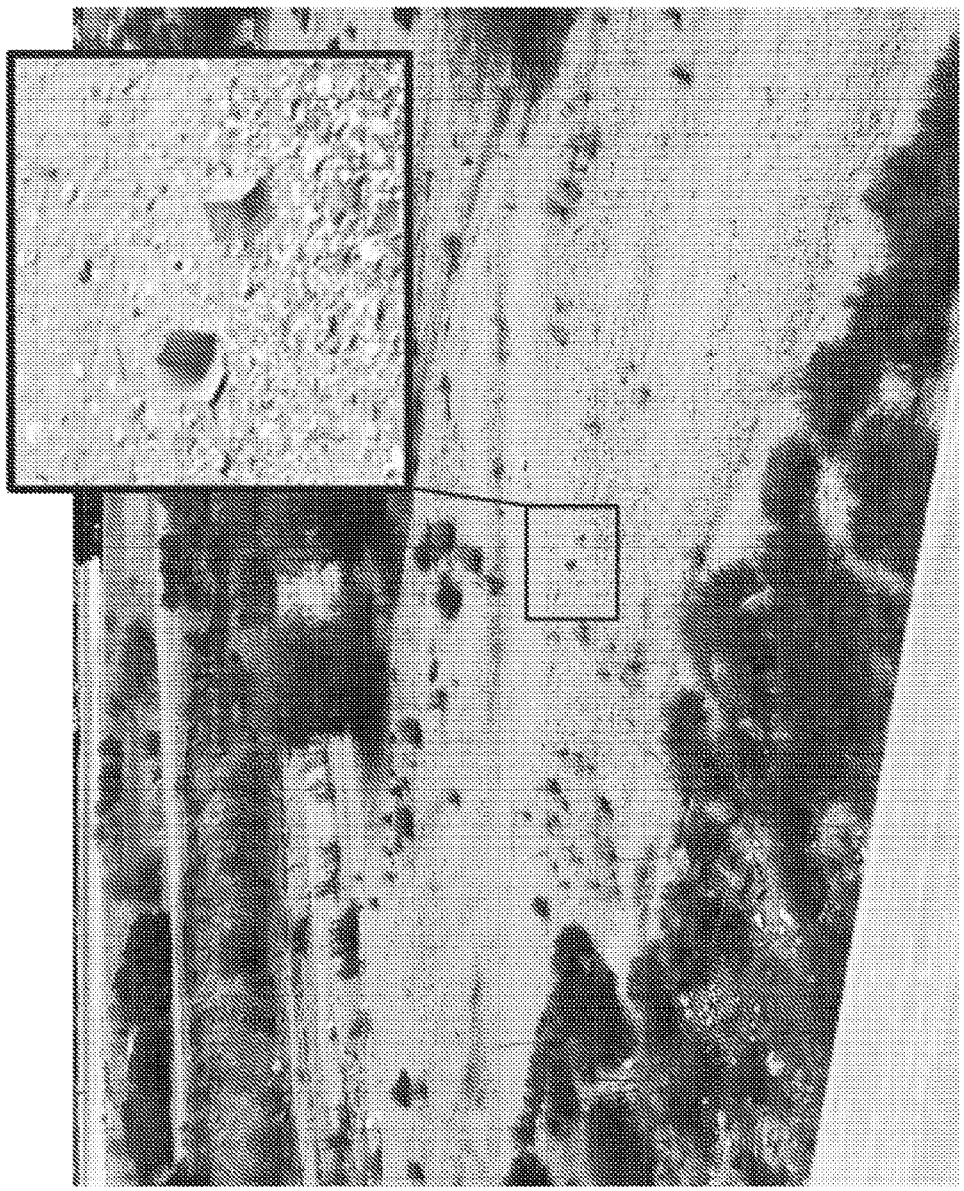
FIG. 5A illustrates an exemplary test reflector arrangement in accordance with various embodiments.
Figure 5B:
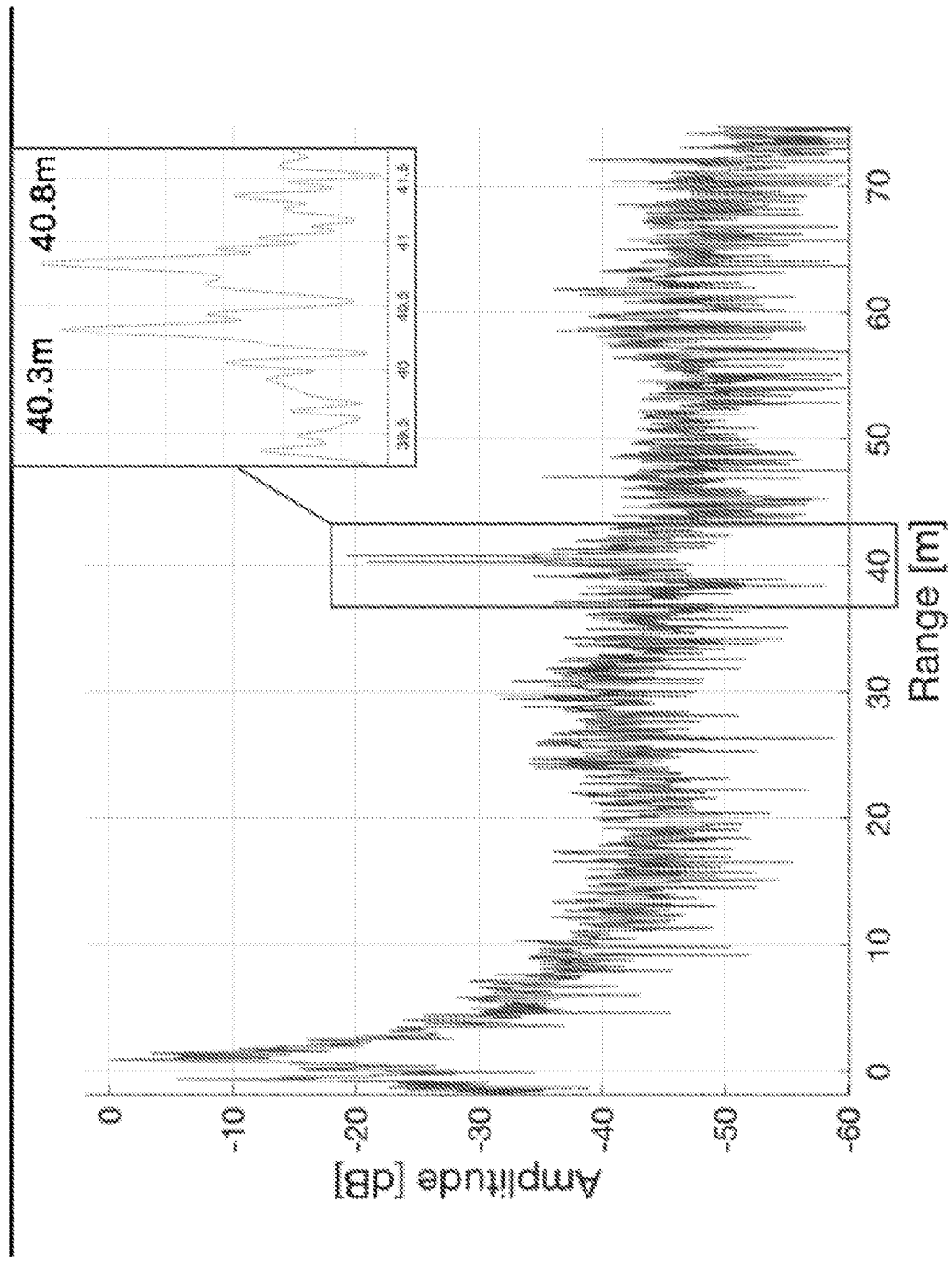
FIG. 5B illustrates performance of an exemplary SDRadar system for the test reflector arrangement of FIG. 5A, in accordance with various embodiments.

In another test, system 200 is applied to the line-of-sight test scene depicted in FIG. 5A. To verify the resolution performance of system 200, we performed the following outdoor test: two corner reflectors with varying ground separation were placed at a slant range of about 40 m from system 200. Again, we reconstruct a SWW over a frequency range of 1-6 GHz in steps of $\Delta f_c$=48 MHz (96% BW efficiency) using a testing methodology consistent with that described previously. The following results were obtained from the closest placement of the two corner reflectors at a separation distance of about 50 cm. In FIG. 5A, the line-of-sight perspective of the test scene is shown. From the reconstructed synthetic wideband signal shown in FIG. 5B, it is clear that the two targets are distinctly resolved by system 200. The slant range separation of the two reflectors is measured to be about 50 cm as shown in FIG. 5B. With the frequency stacking method, the grating lobes are suppressed such that their structure is unapparent in the reconstructed scene and returns from the two corner reflectors are observed. The maximum reflection in the compressed SWW is normalized to a 0 dB reference for ease of comparison. The foregoing experimental results given were verified with incremental separation of the two corner reflectors shown as well as with single corner reflector cases.

Application: Synthetic Aperture

Figure 6:
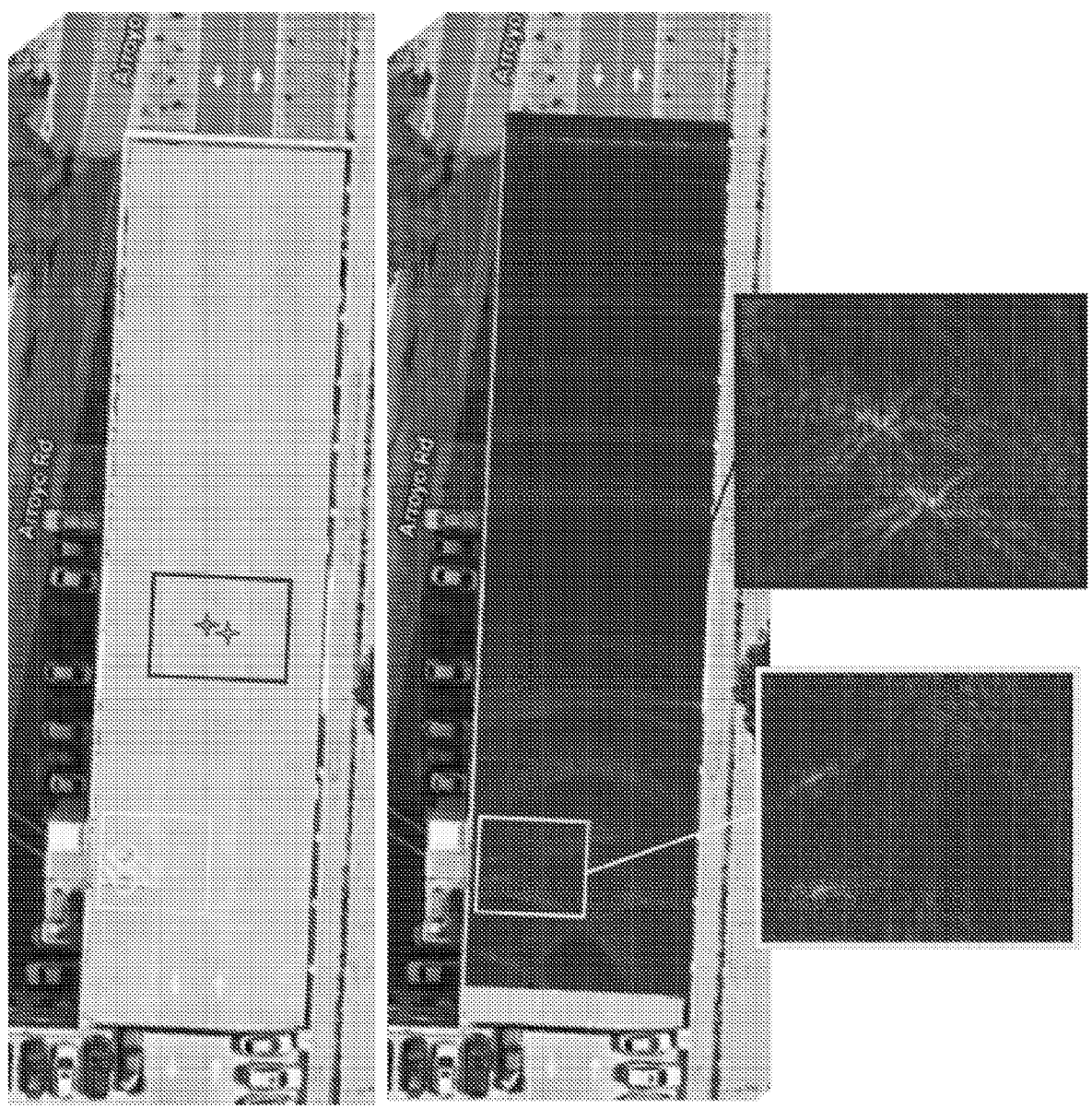
FIG. 6 illustrates application of an exemplary system in a synthetic aperture configuration in accordance with various embodiments.

Exemplary systems and methods are capable of application in synthetic aperture configurations and applications. In various embodiments, using system 200, SAR imaging of the top deck of a parking structure was performed. A radar scan was taken at an along track spatial interval of 10 cm. The aperture is formed by moving system 200, from right to left across the parking deck in discrete steps, wherein the instrument is static for each pulse. We note that this operational mode, while not conventional SAR, samples the doppler bandwidth in discrete observations and is equivalent to any airborne SAR that makes the common "start-stop" approximation, wherein fast-time doppler effects are neglected. FIG. 6 represents an annotated image to indicate the two corner reflectors (red box) and two concrete posts (yellow box); features which appear prominently in the focused SAR image. Satellite imagery of the scene, as well as the incoherently and coherently focused SAR images are shown in FIG. 6. The focused SAR image was generated using a time-domain back-projection algorithm to perform coherent focusing.

Exemplary systems and methods may also be utilized, e.g., for ground-penetrating, snow-penetrating, and/or other suitable radar applications. For example, ground water detection, pipe fault or damage detection, tunnel detection, and the like may be implemented.

Figure 7:
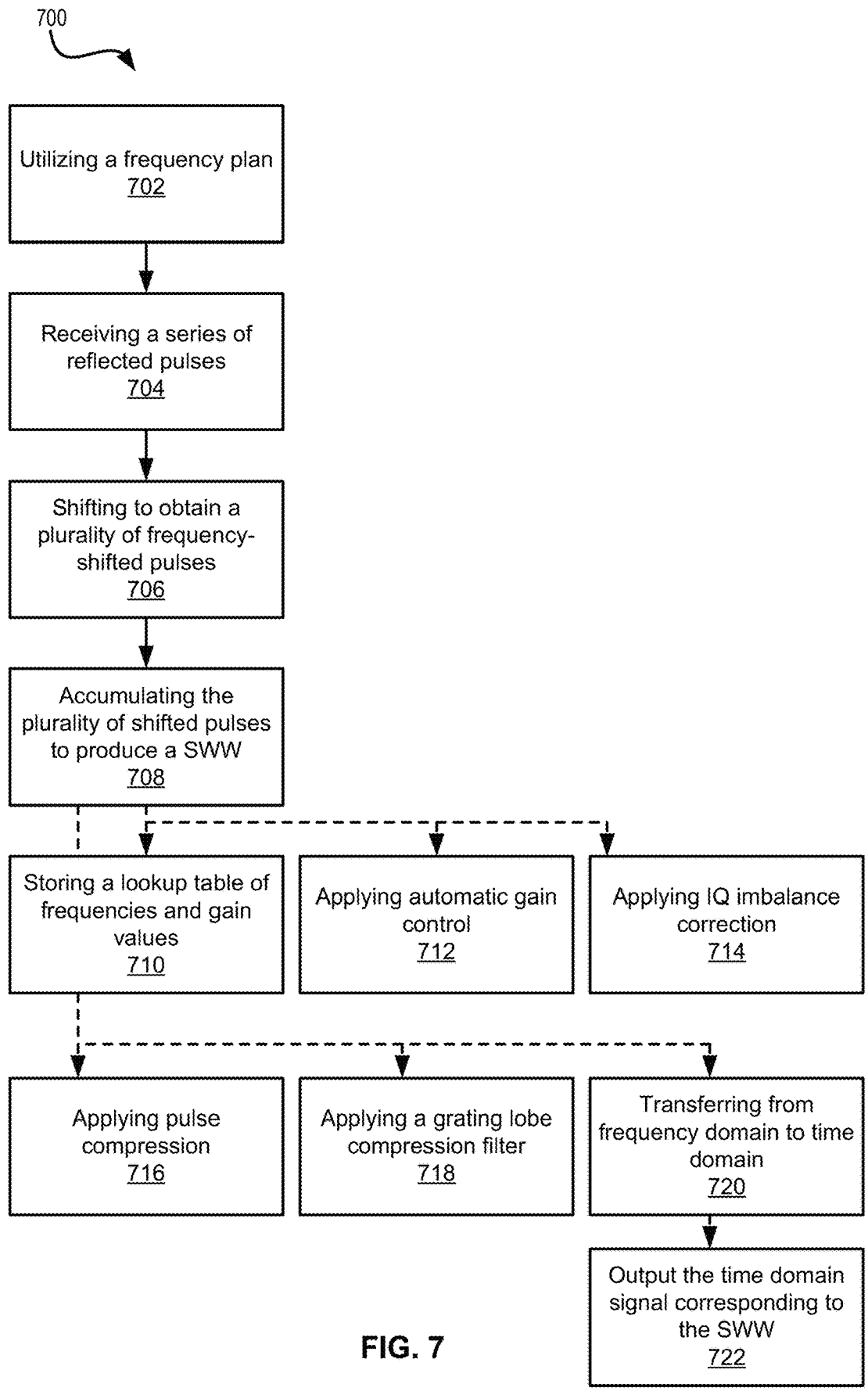
FIG. 7 illustrates a method for SDRadar application in accordance with various embodiments.

With reference now to FIG. 7, in various embodiments, a method for software defined radar sensing may be implemented, for example via system 100 and/or 200. The method for software defined radar sensing 700 includes utilizing, e.g., via an input device or storage device, a frequency plan including a plurality of frequencies to be detected (step 702).

In various embodiments, method 700 includes receiving (e.g., by a processor) a series of reflected pulses each corresponding to a radar signal at one of the plurality of frequencies to be detected, the series of reflected pulses being obtained over a period of time (step 704). Method 700 includes shifting, e.g., by the processor, a corresponding reflected pulse of the series of reflected pulses to a corresponding frequency of the plurality of frequencies to obtain a plurality of frequency-shifted pulses (step 706). Method 700 includes accumulating, e.g., by the processor, each of the plurality of frequency-shifted pulses to construct a SWW (step 708). Method 700 may optionally include storing, in e.g., a memory, a lookup table that associates multiple frequencies with multiple gain values (step 710) and applying, e.g., by the processor, an automatic gain control for the corresponding reflected pulse at each of the plurality of frequencies using the lookup table (step 712).

Method 700 may optionally include performing, e.g., by the processor, I-Q imbalance correction for the corresponding reflected pulse at each of the plurality of frequencies (step 714), or pulse compression for the corresponding reflected pulse at each of the plurality of frequencies to increase processing speed (step 716).

The processor may be configured to dynamically control a quantity of output pulses and frequencies of the output pulses to provide tunable performance across any chosen subset frequency bands, the output pulses later being received as the series of reflected pulses.

Method 700 may optionally include performing, e.g., by the processor, a grating lobe suppression filter to the SWW to shape a reconstructed spectrum and to correct for a hardware transfer function (step 718). Method 700 may optionally include transferring, e.g., by the processor, the SWW from a frequency domain signal to a time domain signal (step 720) and outputting, by an output device, the time domain signal corresponding to the SWW (step 722).

SDRadar systems configured in accordance with the principles of the present disclosure may be configured with any suitable components, structures or elements in order to provide desired functional, communicative, electrical or other related properties. In particular, referring now to the foregoing figures and accompanying disclosure, the process flows and techniques depicted are merely embodiments and are not intended to limit the scope of the disclosure. For example, the steps recited in any of the method or process descriptions may be executed in any suitable order and are not limited to the specific order presented. It will be appreciated that the description makes appropriate references not only to the steps and user interface elements depicted in the figures, but also to the various system components described above. It should be understood at the outset that, although exemplary embodiments are illustrated in the figures and described herein, the principles of the present disclosure may be implemented using any number of suitable techniques and components, whether or not currently known. The present disclosure should, therefore, not be limited to the exemplary implementations and techniques illustrated in the figures and described herein. Unless otherwise specifically noted, components depicted in the figures are not necessarily drawn to scale.

Computer programs (also referred to as computer control logic) may be stored in main memory or secondary memory. Computer programs may also be received via a communication interface. Such computer programs, when executed, enable the computer system to perform the features as discussed herein. In particular, the computer programs, when executed, enable the processor to perform the features of various embodiments. Accordingly, such computer programs represent controllers of the computer system. These computer program instructions may be loaded onto a general-purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In various embodiments, software may be stored in a computer program product and loaded into a computer system using a removable storage drive, hard disk drive, flash memory, or communication interface. The control logic (software), when executed by the processor, causes the processor to perform the functions of various embodiments as described herein. In various embodiments, hardware components may take the form of application specific integrated circuits (ASICs). Implementation of the hardware state machine so as to perform the functions described herein will be apparent to persons skilled in the relevant art(s).

As will be appreciated by one of ordinary skill in the art, certain systems disclosed herein, or components thereof, may be embodied as a customization of an existing system, an add-on product, a processing apparatus executing upgraded software, a stand-alone system, a distributed system, a method, a data processing system, a device for data processing, or a computer program product. Accordingly, any portion of the system or a module may take the form of a processing apparatus executing code, an internet-based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, integrated circuit storage devices, optical storage devices, magnetic storage devices, or the like.

In various embodiments, components, modules, or engines of an exemplary system may be implemented as micro-applications or micro-apps. Micro-apps are typically deployed in the context of a mobile operating system, including for example, a Windows mobile operating system, an Android operating system, an Apple iOS operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

Systems and methods may be described herein in terms of functional block components, screen shots, optional selections, and various processing steps. It should be appreciated that such functional blocks may be realized by any number of hardware or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, JavaScript Object Notation (JSON), VBScript, assembly, perl, php, awk, python, extensible markup language (XML), or the like with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT*, VBScript, or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA© Cryptography" by Jonathan Knudson, published by O'Reilly & Associates (1998); (3) "Cryptography & Network Security: Principles & Practice" by William Stallings, published by Prentice Hall; all of which are hereby incorporated by reference.

Exemplary systems and methods may be described herein with reference to screen shots, block diagrams and flowchart illustrations of methods, apparatus, and computer program products according to various embodiments. It will be understood that certain functional blocks of the block diagrams and the flowchart illustrations, and combinations of functional blocks in the block diagrams and flowchart illustrations, respectively, can be implemented by computer program instructions. Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user applications, webpages, websites, web forms, prompts, etc. Practitioners will appreciate that the illustrated steps described herein may comprise any number of configurations including the use of applications, webpages, web forms, popup applications, prompts, and the like. It should be further appreciated that the multiple steps as illustrated and described may be combined into single webpages or applications but have been expanded for the sake of simplicity. In other cases, steps illustrated and described as single process steps may be separated into multiple webpages or applications but have been combined for simplicity.

For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships or physical couplings between the various elements. It should be noted that many alternative or additional functional relationships or physical connections may be present in a practical system.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles (for example, a hydrogen tank from a less-full state to a more-full state, a battery from a lower state of charge to a higher state of charge, and so forth).

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; or like data useful in the operation of the system. As those skilled in the art will appreciate, user computer may include an operating system as well as various conventional support software and drivers typically associated with computers.

The present system or certain part(s) or function(s) thereof may be implemented using hardware, software, or a combination thereof and may be implemented in one or more computer systems or other processing systems. However, the manipulations performed by embodiments may be referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communication bus, cross-over bar, network, etc.). Various software embodiments are described in terms of this exemplary computer system. After reading this description, it will become apparent to a person skilled in the relevant art(s) how to implement various embodiments using other computer systems or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, or a removable storage drive. The removable storage drive reads from or writes to a removable storage unit in a well-known manner. As will be appreciated, the removable storage unit includes a computer usable storage medium having stored therein computer software or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system.

The terms "computer program medium," "computer usable medium," and "computer readable medium" are used to generally refer to media such as flash memory, hard drives, and the like. These computer program products provide software to a computer system. The computer system may also include a communication interface. A communication interface allows software and data to be transferred between the computer system and external devices. Examples of communication interface may include a modem, a network interface (such as an Ethernet card), a communication port, a Personal Computer Memory Card International Association (PCMCIA) slot and card, etc. Software and data transferred via the communication interface are in the form of signals which may be electronic, electromagnetic, optical, or other signals capable of being received by a communication interface. These signals are provided to the communication interface via a communication path (e.g., a channel). This channel carries signals and may be implemented using wire, cable, fiber optics, a telephone line, a radio frequency (RF) link, wireless and other suitable communication channels.

Any databases discussed herein may include relational, hierarchical, graphical, blockchain, object-oriented structure, or any other database configurations. Additionally, transactions and/or data exchanges disclosed herein may utilize blockchain, distributed ledger, and/or similar approaches, for example for verification, validation, and/or data integrity purposes. Moreover, any database may also include a flat file structure wherein data may be stored in a single file in the form of rows and columns, with no structure for indexing and no structural relationships between records. For example, a flat file structure may include a delimited text file, a CSV (comma-separated values) file, or any other suitable flat file structure. Common database products that may be used to implement the databases include DB2® by IBM® (Armonk, NY), various database products available from ORACLE® Corporation (Redwood Shores, CA), MICROSOFT ACCESS® or MICROSOFT SQL SERVER® by MICROSOFT® Corporation (Redmond, Washington), MYSQL® by MySQL AB (Uppsala, Sweden), MONGODB®, Redis, Apache Cassandra®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, or the like. The association step may be accomplished by a database merge function, for example, using a "key field" in preselected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with the system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by a third party unrelated to the first or second party. Each of these three exemplary data sets may contain different information that is stored using different data storage formats or techniques. Further, each data set may contain subsets of data that also may be distinct from other subsets.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value. Yet further, as used herein, the term "proximate", "proximity", or the like may refer to a distance between objects being 20 centimeters or less, or 15 centimeters or less, or 10 centimeters or less, or 5 centimeters or less.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method for software defined radar sensing, the method comprising:
   receiving, at a processor, a frequency plan including a plurality of frequencies to be detected;
   receiving, by the processor, a series of reflected pulses each corresponding to a radar signal at one of the plurality of frequencies to be detected, the series of reflected pulses being obtained over a period of time;
   shifting, by the processor, a corresponding reflected pulse of the series of reflected pulses to a corresponding frequency of the plurality of frequencies to obtain a plurality of frequency-shifted pulses;
   accumulating, by the processor, each of the plurality of frequency-shifted pulses to construct a synthetic wideband waveform (SWW);
   performing, by the processor, construction of a reference SWW from receive calibration channel data to form a grating lobe suppression filter; and
   performing, by the processor, the grating lobe suppression filter to the SWW to shape a reconstructed spectrum and to correct for a hardware transfer function.

2. The method of claim 1, further comprising:
   storing, in a memory, a lookup table that associates multiple frequencies with multiple gain values; and
   applying, by the processor, an automatic gain control for the corresponding reflected pulse at each of the plurality of frequencies using the lookup table.

3. The method of claim 1, further comprising performing, by the processor, I-Q imbalance correction for the corresponding reflected pulse at each of the plurality of frequencies.

4. The method of claim 1, further comprising performing, by the processor, pulse compression for the corresponding reflected pulse at each of the plurality of frequencies to increase processing speed.

5. The method of claim 1, wherein the processor is configured to dynamically control a quantity of output pulses and frequencies of the output pulses to provide tunable performance across any chosen subset frequency bands, the output pulses later being received as the series of reflected pulses.

6. The method of claim 1, wherein the SWW provides a resolution of at least 3 centimeters.

7. The method of claim 1, further comprising:
   transferring, by the processor, the SWW from a frequency domain signal to a time domain signal; and outputting, by the processor, the time domain signal corresponding to the SWW.

8. The method of claim 1, wherein receiving the series of reflected pulses includes receiving the series of reflected pulses via a microcontroller that is coupled to a software defined radio consisting of a field programmable gate array (FPGA) and radio frequency (RF) front end electronics configured for RF communication.

9. A software defined radar sensing system comprising:
a processor; and
an input device coupled to the processor, the software defined radar sensing system configured to:
receive, by the processor and via the input device, a frequency plan including a plurality of frequencies to be detected;
receive, by the processor, a series of reflected pulses each corresponding to a radar signal at one of the plurality of frequencies to be detected, the series of reflected pulses being obtained over a period of time;
shift, by the processor, a corresponding reflected pulse of the series of reflected pulses to a corresponding frequency of the plurality of frequencies to obtain a plurality of frequency-shifted pulses;
accumulate, by the processor, each of the plurality of frequency-shifted pulses to construct a synthetic wideband waveform (SWW);
perform, by the processor, construction of a reference SWW from receive calibration channel data to form a grating lobe suppression filter; and
perform, by the processor, the grating lobe suppression filter to the SWW to shape a reconstructed spectrum and to correct for a hardware transfer function.

10. The software defined radar sensing system of claim 9, further comprising a memory configured to store a lookup table that associates multiple frequencies with multiple gain values, the processor further configured to apply an automatic gain control for the corresponding reflected pulse at each of the plurality of frequencies using the lookup table.

11. The software defined radar sensing system of claim 9, wherein the processor is further configured to perform 1-Q imbalance correction for the corresponding reflected pulse at each of the plurality of frequencies.

12. The software defined radar sensing system of claim 9, wherein the processor is further configured to perform pulse compression for the corresponding reflected pulse at each of the plurality of frequencies to increase processing speed.

13. The software defined radar sensing system of claim 9, wherein the processor is further configured to dynamically control a quantity of output pulses and frequencies of the output pulses to provide tunable performance across any chosen subset frequency bands, the output pulses later being received as the series of reflected pulses.

14. The software defined radar sensing system of claim 9, wherein the SWW provides a resolution of at least 3 centimeters.

15. The software defined radar sensing system of claim 9, further comprising an output device, the processor further configured to transfer the SWW from a frequency domain signal to a time domain signal, the output device configured to output the time domain signal corresponding to the SWW.

16. The software defined radar sensing system of claim 9, wherein receiving the series of reflected pulses includes receiving the series of reflected pulses via a microcontroller that is coupled to a software defined radio consisting of a field programmable gate array (FPGA) and radio frequency (RF) front end electronics configured for RF communication.

* * * * *